Sept. 29, 1931.  E. T. MUG  1,825,119
INDIVIDUAL MOTOR DRIVE FOR ROLLER CONVEYER ROLLS
Filed March 6, 1930   3 Sheets-Sheet 1
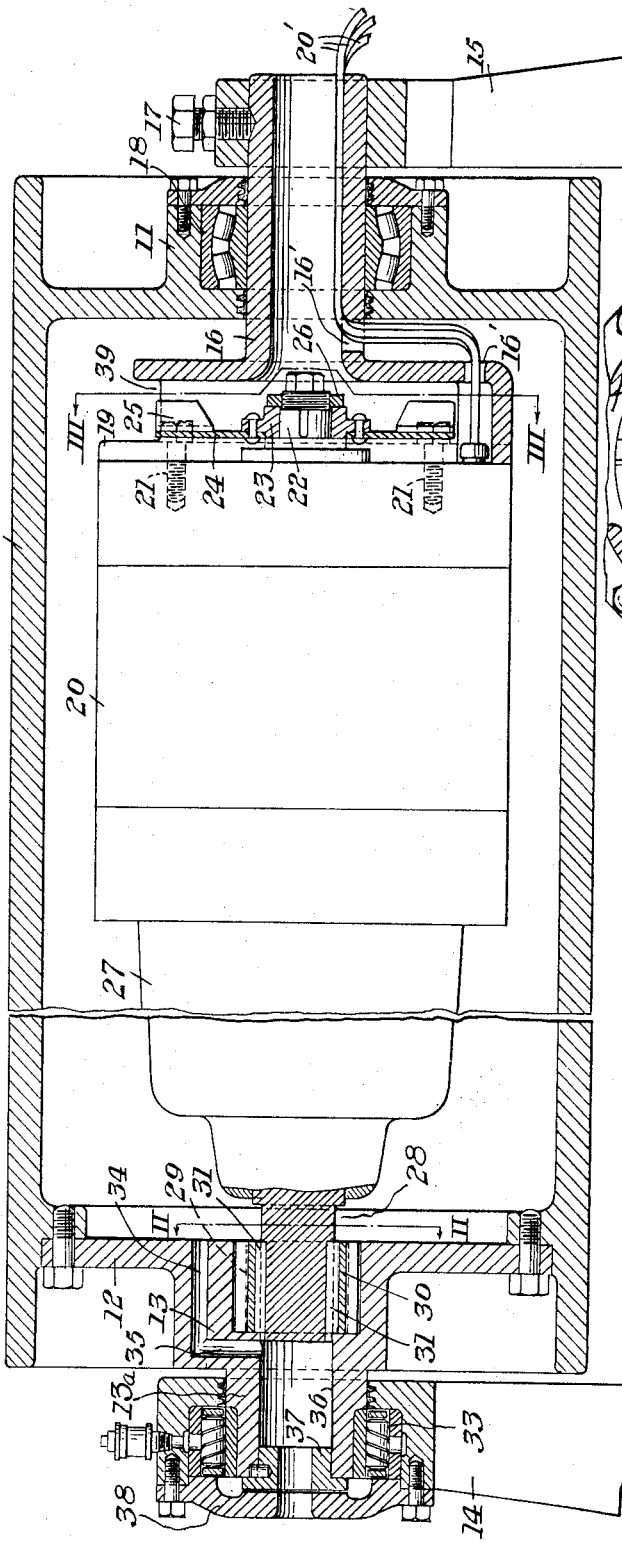
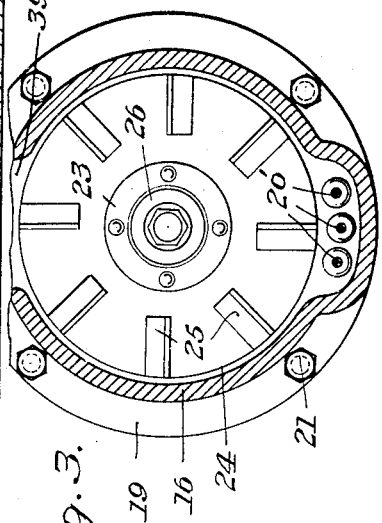
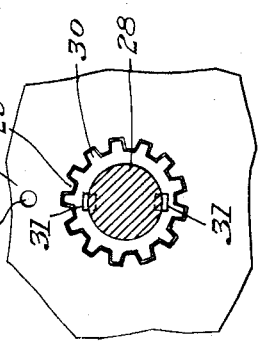
INVENTOR
Edward T. Mug
by his attorneys
Byrnes, Stebbins,
Parmelee & Blenko Sept. 29, 1931.   E. T. MUG   1,825,119
INDIVIDUAL MOTOR DRIVE FOR ROLLER CONVEYER ROLLS
Filed March 6, 1930   3 Sheets-Sheet 2

INVENTOR
Edward T. Mug
by his attorneys
Byrnes, Stebbins, Parmelee & Blenko

Sept. 29, 1931.  E. T. MUG  1,825,119
INDIVIDUAL MOTOR DRIVE FOR ROLLER CONVEYER ROLLS
Filed March 6, 1930   3 Sheets-Sheet 3

INVENTOR
Edward T. Mug
by his attorneys
Byrnes, Stebbins, Parmelee & Blenko

Patented Sept. 29, 1931

1,825,119

UNITED STATES PATENT OFFICE

EDWARD T. MUG, OF PITTSBURGH, PENNSYLVANIA, ASSIGNOR TO CROCKER-WHEELER ELECTRIC MANUFACTURING COMPANY, OF AMPERE, NEW JERSEY, A CORPORATION OF NEW JERSEY

INDIVIDUAL MOTOR DRIVE FOR ROLLER CONVEYER ROLLS

Application filed March 6, 1930. Serial No. 433,845.

My invention relates to motor driven rollers for conveying processes and has particular reference to a conveyer roll having an internal driving motor.

The many difficulties experienced in connection with mechanically driven conveyers rolls such as those employed on roll tables in steel mills have lead to several suggestions for improving this type of conveyer. The obvious objections to the mechanical drive for roll tables include the fact that the gears embodied therein are subject to excessive wear and are difficult of lubrication. High maintenance costs are thus encountered. Another objection is that the space required by the mechanical drive makes it difficult to apply in close quarters.

In order to overcome these objections, it has previously been proposed to employ a conveyer roll having a driving motor built therein, the roll serving as the rotor of an electric motor, the stator being mounted within the roll and locked against rotation. This construction has likewise developed several objections to its use. In the first place, due to the limitations of the type of motor employed, the low speed required for conveyer purposes cannot always be obtained from alternating currents of commercial frequency. It therefore becomes necessary to provide frequency-changing means to drive the conveyer rolls at proper speed. Because of the small diameter of the roll compared with its length, the built-in motor is not adaptable for high power factor, high starting torque, and high efficiency. The motor is necessarily a slow speed motor because of the low speed of the conveyer, and it is known that such a motor cannot be designed to give as high starting and operating characteristics as can be obtained with motors of higher speed, and still be of limited size.

I have invented a conveyer roll having an internal motor, which is not subject to any of the foregoing objections, and, in addition, is characterized by further features of novelty. According to the invention, I mount a standard, high-speed, small dimension motor within a drum or cylinder which is suitable for conveying purposes. The motor may be an alternataing or direct current machine, constant or variable speed, or any other type, and is secured to a hollow fixed member extending through one end of the drum. The motor is connected to the drum through a standard speed changing gear. The drum is journaled at one end on the fixed member and its other end is provided with a trunnion for rotation in a suitable bearing.

By utilizing a standard motor and a speed changing gear, the cost of the device is reduced since no special design of parts is necessitated. Both the motor and speed changing gear are well known pieces of equipment and may be obtained in a wide variety of sizes and ratings. By employing a high-speed motor, I obtain the advantage of the full power of the motor which is applied to the roll or drum through the speed changing gear. The power factor, starting torque, and efficiency of the motor are high and, since it is a high speed machine, it may be designed for large output without exceeding the limited dimensions made necessary by the size of the conveyer roll.

The invention also contemplates improved methods and means for cooling the motor driven drum by means of air or a liquid cooling medium. The bearings supporting the drum and the driving connections between the motor and the drum, furthermore, are of such character that any distortions of the drum or roll caused by uneven heating thereof will not impose any strain upon the bearings or driving connections. The problem of cooling the roll is considerably simplified by using a standard motor instead of the type of roll in which the drum constitutes the rotor of the motor. In the latter arrangement, the air gap between the roll or motor and the stator is necessarily quite small and only a small volume of air can be passed therethrough. No such difficulty obtains in my structure, since ample clearance space between the motor and the drum can be provided to permit a cooling stream to be passed through the drum.

It is also within the scope of the invention to employ the drum having an internal driving motor, for hoisting purposes. In such cases, the drum is made grooved or smooth for receiving a hoisting cable, and a brake wheel is mounted on an extension of the motor shaft which protrudes from the fixed sleeve.

Further features of novelty include the provision of a centrifugal fan driven by the motor and located within the yoke or sleeve to which the motor is secured. This fan causes a draft of air to be drawn through the sleeve. The air is allowed to escape freely through holes in the opposite end of the drum.

For a clear understanding of the invention, reference is made to the accompanying drawings, in which, Figure 1 is a longitudinal sectional view of the drum showing a present preferred embodiment of the invention;

Figure 2 is a sectional view along the line II—II of Figure 1;

Figure 3 is a sectional view along the line III—III of Figure 1;

Figure 4:
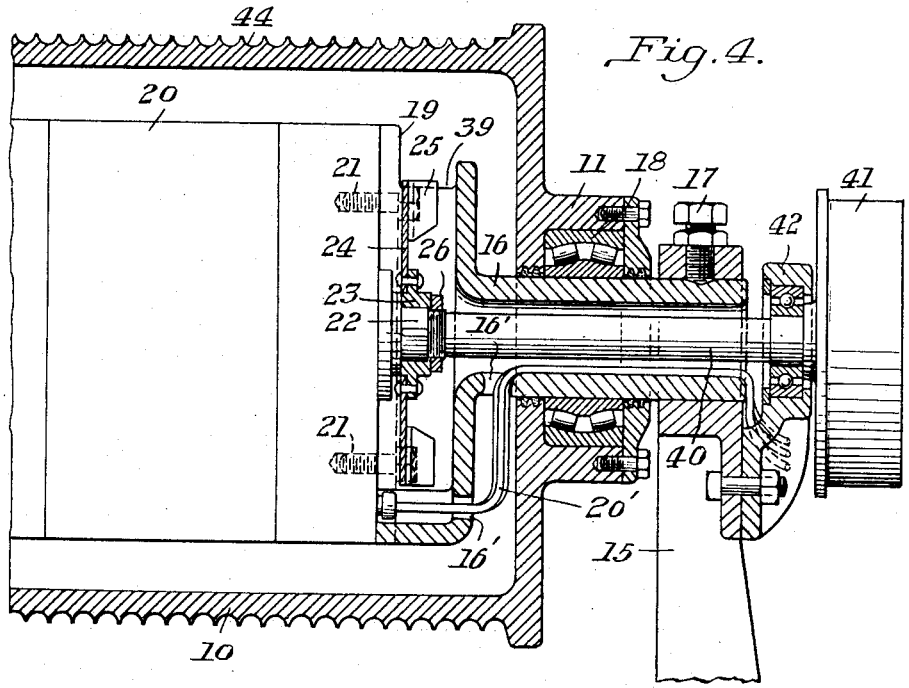
Figure 4 is a partial section showing the drum adapted for hoisting purposes.

Referring in detail to the drawings, and especially to Figures 1 through 3, the conveyer roll comprises a drum or cylinder 10 having an integral hub 11 formed at one end thereof. A removable disk 12 provided with a hub 13, having a trunnion 13a, is secured within the other end of the cylinder 10. If air cooling is employed, the disk is perforated to permit exit of the cooling blast. Bearing posts 14 and 15 are provided for supporting the roll and may be part of a roll table, including a plurality of rolls, some or all of which may be driven.

A hollow member 16 is secured in the bearing post 15 by means of a set screw 17. The member 16 carries roller bearings 18 which provide a rotatable support for the hub 11 of the drum 10. I prefer to employ self-aligning roller bearings to permit a slight distortion of the drum 10 without imposing undue strain on the sleeve 16.

The member 16 is provided with a flange 19 for a driving motor 20 secured to this flange by means of screws 21. Current is supplied to the motor through the leads 20' passing through the sleeve 16 and the openings 16' therein. The motor 20 is a standard unit and has a shaft 22 which projects from the frame. The extension 22 carries a collar 23 to which is secured a disk 24. Fan blades 25 are secured to the disk 24 and the collar 23 is locked on the shaft 22 by means of a nut 26 engaging the reduced threaded end of the shaft 22.

A standard speed changing gear 27, such as that shown in United States Patents Nos. 1,623,052, 1,709,345 and 1,737,997, is bolted to the motor frame in any convenient manner so that the motor drives the speed changing gear and a shaft 28 projecting from the latter. The hub 13 of the disk 12 is provided with internal gear teeth 29 and a driving pinion 30 is keyed to the shaft 28 by keys 31. A flexible driving connection between the shaft 28 and the drum 10 is thus provided. This flexible connection, however, may be omitted if it is not desired. The hub 13 has a reduced outer end or trunnion 13a which is rotatably mounted in bearings 33 carried by the post 14. Although I have shown a self-aligning bearing 18 and a roller bearing 33, it is obvious that both bearings may be of either type. Instead of the internal gear and pinion 29 and 30, any equivalent means for providing a flexible connection may be employed.

The purpose of the self-aligning bearing 18 and the flexible connection between the shaft 28 and the disk 12 is to permit slight variations in the dimensions or shape of the drum 10 without straining the shafts, bearings, or other rotating members. If the conveyer roll is employed in a steel mill and a hot strip should rest thereon for any length of time, the upper surface of the roll would be obnormally heated. This would cause an expansion of the roll along its upper surface, the remainder of the roll being comparatively cool. Unless some arrangement were made to permit distortion of the drum under such circumstances, severe strain might be placed upon the rotating members with the consequent liability of breakage. The connection between the gears 29 and 30 permits a lateral as well as an angular movement of the disk 12 without straining the shaft 28. The bearing 18 permits a slight distortion of the drum 10 without injuring the member 16.

The hub 13 is provided with a radial hole 35 and an axial passage 34. The trunnion 13a of the hub 13 is bored out as shown at 36 and a bushing 37 is fitted therein. The bushing has an axial hole in alignment with a corresponding hole in a cover plate 38. An exit passage for the cooling medium drawn into the drum through the member 16 is thus provided. If air is employed, it passes through the member 16 into the space occupied by the fan and out of one or more openings 39 in the yoke portion of the sleeve. Because of the rotation of the drum, a thorough cooling thereof by the air blast induced by the fan blades 25 is effected. The air is then discharged through holes in the disk 12 (not shown). The passages 34 and 35 are provided to accommodate a liquid medium such as oil or water, which is supplied and carried away by means shown in Figure 5, to be described later.

Referring to Figure 4, I have illustrated the drum shown in Figure 1, adapted for hoisting purposes. When the drum is utilized for hoisting purposes, it is advisable to form an extension 40 of the motor shaft 22 for supporting a brake wheel 41. The wheel 41 may be engaged by any suitable type of brake band or operating mechanism. An auxiliary bearing 42 prevents chattering of the extension 40 of the shaft 22. The bearing 42 is spaced from the sleeve 16 to permit cooling air to flow into the sleeve as already described. The surface of the drum is grooved as at 44 for winding a cable thereon, or it may have a smooth cylindrical surface.

Figure 5:
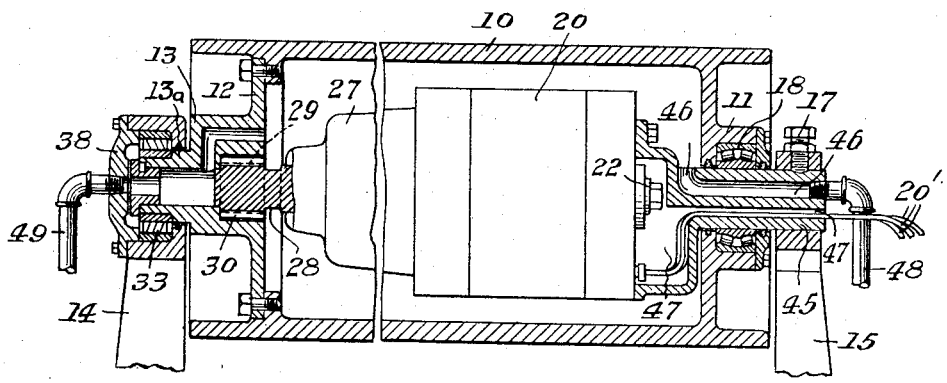
Figure 5 is a view similar to Figure 1, showing provisions for external forced cooling of the interior of the drum.

In Figure 5, I have illustrated an arrangement of the conveyer roll which is adapted for external forced cooling by a liquid medium. In this arrangement, I employ a sleeve 45 corresponding to the sleeve 16 of Figures 1 and 4. The sleeve 45 has a passage 46 therein for cooling fluid, and a passage 47 for the motor leads 20'. The construction is otherwise the same as that of Figures 1 and 4, except that the passages 34 and 35 constitute the exit instead of holes in the end of the drum. The sleeve 45 has a pipe connection 48 for supplying cooling fluid, and a similar connection 49 terminates at the cover plate 38 for exhausting the cooling fluid from the drum 10. Since the motor 20 can be entirely enclosed, cooling fluid such as oil or water may be passed through the drum 10 to maintain the latter at low temperature. If a liquid cooling medium is employed, packing glands or gaskets may be applied wherever necessary to make leakproof connections, and prevent fluid from getting into the bearings. External forced cooling of the drum 10 may be necessary only where the drum is called upon to carry hot material as in a steel mill roll table.

Figure 6:
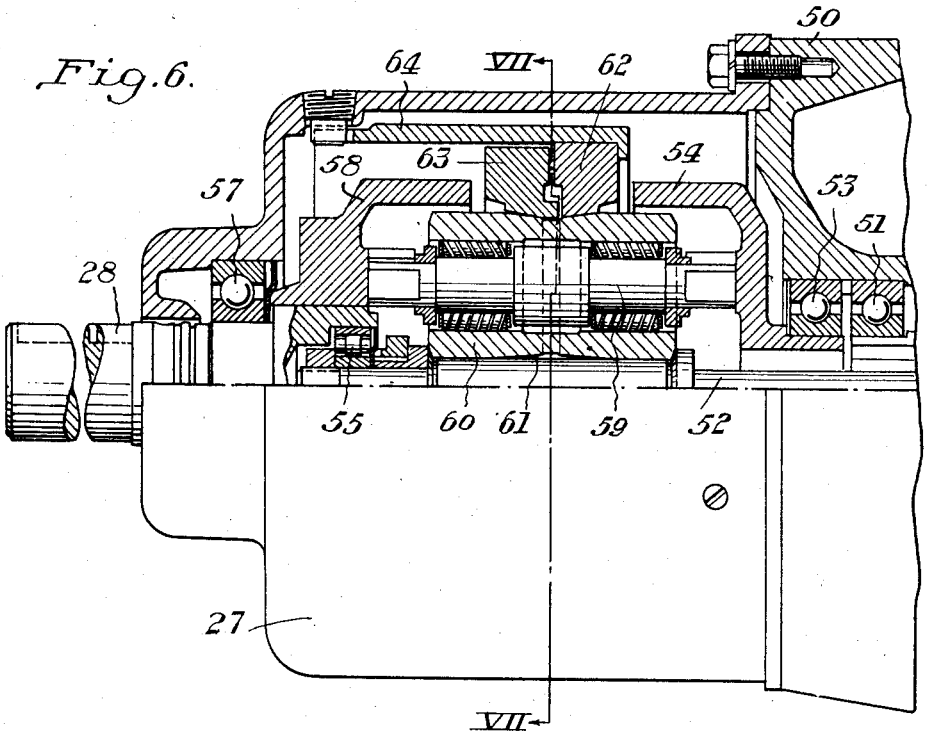
Figure 6 is a partial central sectional view through one form of speed reducing mechanism which I find is desirable to employ in connection with the invention, although I make no claim herein to the specific details thereof.
Figure 7:
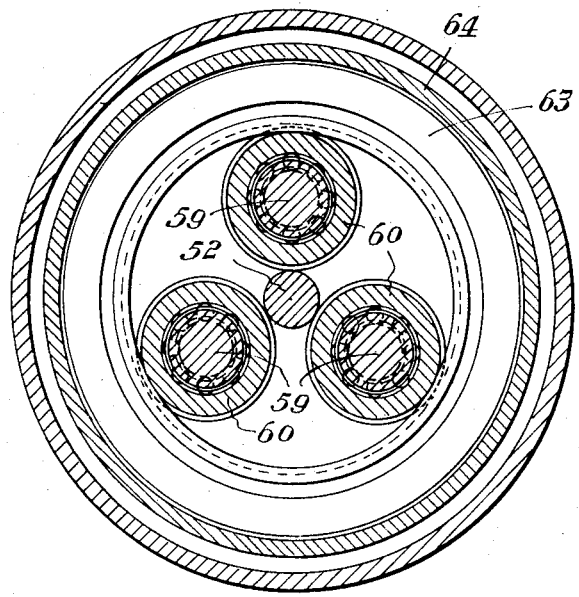
Figure 7 is a transverse sectional view thereof along the line VII—VII of Figure 6.
Figure 8:
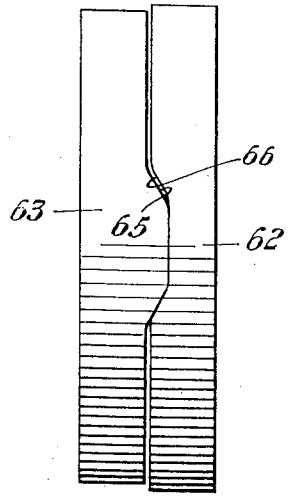
Figure 8 is an elevational view of a detail apart from the related structure.

As an example of the speed changing gear which I prefer to employ in connection with the invention, Figures 6 through 8 show a friction type speed reducer, such as is disclosed in the patents above-mentioned. The casing 27 of the speed reducing mechanism is bolted to an end-bell 50 of the motor housing 20. Within the end-bell, a bearing 51 is provided for the motor shaft to which a high speed shaft 52 of the speed reducing gear is coupled by means of a plug and socket joint. Another bearing 53 is provided in the end-bell 50 for a rotatable cage spider 54.

The outer end of the shaft 52 is supported in a bearing 55 seated in a recess in the end of the low speed shaft 28. The shaft 28 is supported in the casing 27 by a bearing 57.

A cage spider 54 and a cage flange 58 provide bearings for pins 59 on which friction rolls 60 are journaled. The rolls 60 are adapted to have frictional engagement with the shaft 52 and are effective by reason of such engagement to turn the shaft 28 at a reduced speed.

The rolls 60 have contracted portions 61 which are adapted to engage a stationary ring 62 and a shiftable ring 63. The ring 62 is supported by a ring guide 64 secured to the housing 27. The rings 62 and 63 have interfitting projections and recesses 65 and 66. The projections and recesses are effective on relative movement of the rings to separate the latter. Separation of the rings produces a closer fit between the rings and the friction rolls 60. The proper fit of the friction rolls is always insured. The rolls travel around the rings 62, 63 as an outer raceway.

Many advantages of the construction illustrated will be apparent. The cooling fluid is applied directly to the interior of the drum 10 and to the exterior of the motor 20. All heat generated within the motor or conducted into the drum 10 from outside sources, is thus rapidly carried away by the cooling fluid and all parts of the apparatus are maintained at safe operating temperatures. The conveyer roll is entirely self-contained, and may be removably mounted in its bearing posts so that the removal of a roll can be accomplished in a very short time. Other advantages of the invention, such as the high power factor, high starting torque, and high efficiency for which it is possible to design the motor have already been explained. The structure, as a whole, is simple, compact and inexpensive to manufacture. The driving units, being well known commercial parts, do not add greatly to the cost of the roll, as is the case with previous devices of this character.

Although I have illustrated and described a present preferred embodiment of the invention, many changes therein may be made without departing from the spirit of the invention. For this reason, all such changes are to be comprehended within the scope of the appended claims.

I claim:

1. In a conveyer roller, a stationary hollow member, a motor secured thereto, a drum enclosing the motor having one end journaled on said member, a speed reducing drive within said drum, a spur gear axially disposed therein coupled to said drive, a disk secured to the other end of the drum and trunnioned to a fixed bearing, and an internal gear on said disk engaging said spur gear.

2. In a motor roller, the combination with a bearing, a hollow member mounted therein, a motor housing secured to the member, impellers rotatably carried by the motor between the housing and said member for cooling the exterior of the housing, a drum having one end journaled on said member and surrounding said motor, and an exhaust port in the other end of the drum for the air drawn through said member by said impellers.

3. The combination with a drum rotatably mounted at one end on a fixed member and having a trunnion at the other end, of a motor within the drum for driving it, and openings in said member and trunnion for supplying cooling fluid to the exterior of said motor and the interior of said drum.

4. In combination, a drum journaled at one end on a fixed member and having a trunnion at the other end rotatable in a bearing, and a motor within the drum secured to said member for driving said drum, the driving elements being totally enclosed within the drum.

5. In combination, a drum journaled at one end on a fixed member and having a trunnion at the other end rotatable in a bearing, and a motor within the drum secured to said member and having a driving connection with said drum terminating within the end thereof.

6. In combination, a drum journaled at one end on a fixed member and having a trunnion at the other end rotatable in a bearing, and a motor within the drum secured to said member and having a driving connection with said trunnion, including an internal gear on the trunnion and a pinion driven by the motor for cooperating therewith.

7. In combination, a drum journaled at one end on a fixed member and having a trunnion at the other end rotatable in a bearing, and a motor within the drum secured to said member for driving said drum, a centrifugal fan between said sleeve and the motor and driven by the latter for supplying cooling fluid to the interior of the drum.

8. In a motor roller, a hollow member held stationary in a bearing support and having a flange formed at the free end thereof, a drum having its ends closed by disks, one disk being journalled on said member and the other being provided with a trunnion seated in a fixed bearing, a motor secured to said flange, a speed reducer cooperating with said motor and having a driving shaft cooperating with said trunnioned disk for driving the drum.

9. In a driving roll, the combination with a fixed hollow member having a flange, a drum journalled at one end on said member and having a trunnion for rotatably supporting the other end, of a motor secured to said flange, a speed reducer secured to the motor and having a shaft for driving the drum cooperating with the trunnioned end thereof.

10. A conveying roller comprising a hollow cylinder rotatably supported at one end on a fixed member and having a trunnion at the other end rotatably seated in a bearing, and driving means engaging the trunnioned end of the drum including a speed reducer and a motor connected thereto and secured to said member.

11. Supporting means for an internally motor driven conveying roll comprising a fixed member extending through one end of the roll, affording a journal bearing therefor and terminating just within the end of the roll, and a disk in the other end of the roll trunnioned for rotation in a bearing coaxial with said member.

12. In a conveyer roll, an internal driving motor, impeller blades external to the motor and inlet and outlet ports for supplying cooling fluid to the external surface of the motor and the internal surface of the roll.

13. In a conveyer roll, an internal driving motor having an airtight housing, and fluid circulating means driven by the motor for supplying cooling fluid to the exterior of the housing and the interior of the roll.

14. A conveyer roll comprising a drum journalled at one end on a fixed member, and having a trunnion at the other end rotatably seated in a bearing, a motor in the drum secured to the fixed member, and a drive shaft for the drum terminating within the latter.

15. In a conveyer roller, the combination with a rotatably mounted drum, a stationary supporting member extending into one end of the drum and terminating therein, a motor within the drum for driving it mounted on said member and a speed reducer connected between the motor and drum.

16. In a motor drive, a stationary bracket with one end adapted to engage a motor frame, a drum enclosing the motor engaging end of the bracket and having one end journalled thereon and the other end trunnioned in a stationary bearing pedestal, a motor on said bracket within the drum, and a speed reducer with an axial high speed shaft attached integrally to said motor frame and an axial low speed shaft coupled to said drum.

17. In combination, a metallic drum, a motor supported stationary therein on a fixed bracket extending into and terminating within the drum, a speed reducer secured to the motor frame, and a driving connection between the speed reducer and the drum.

18. The combination with a drum, of a motor supported therein on a fixed bracket extending into and terminating within the drum, of a speed reducer secured to the motor frame and connected to the motor and the drum for driving the latter.

In testimony whereof I have hereunto set my hand.

EDWARD T. MUG.